Figure 1:
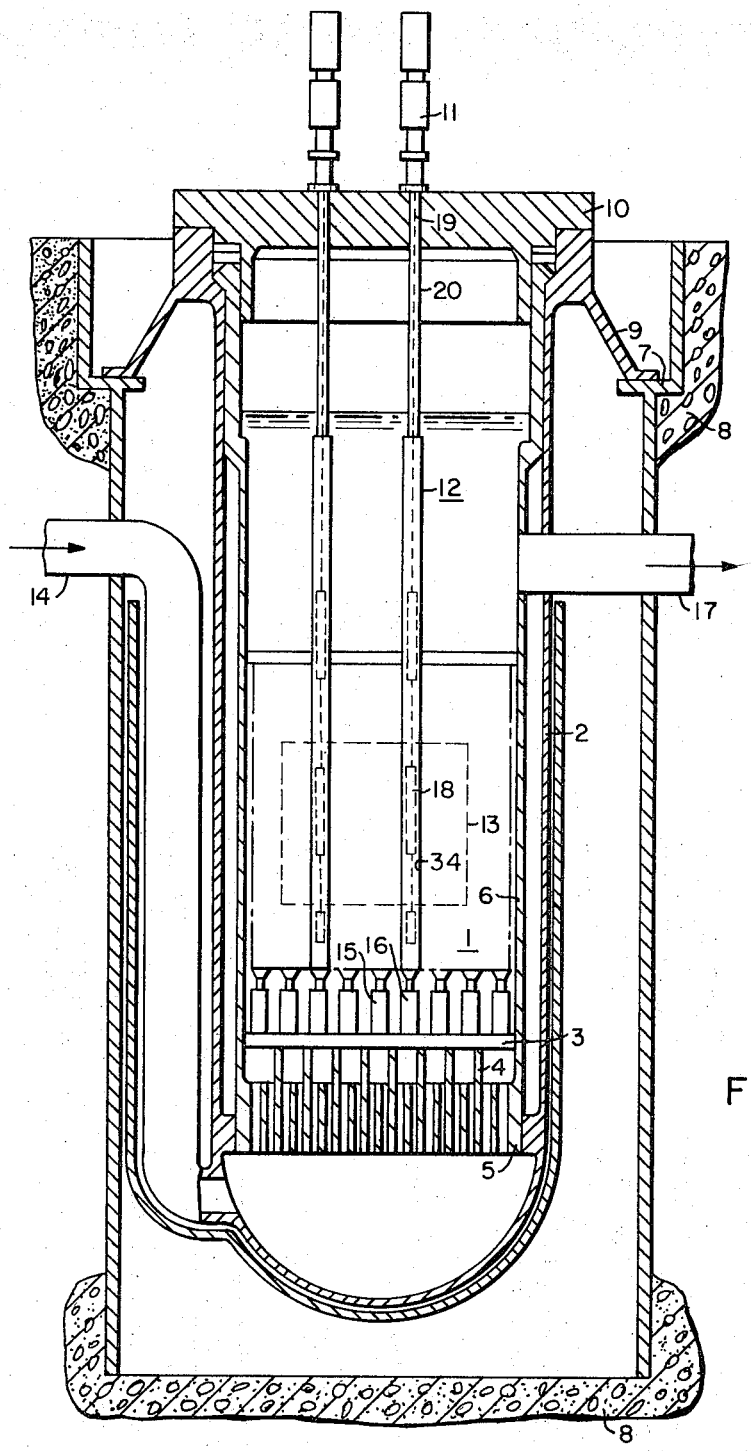
Figure 2A:
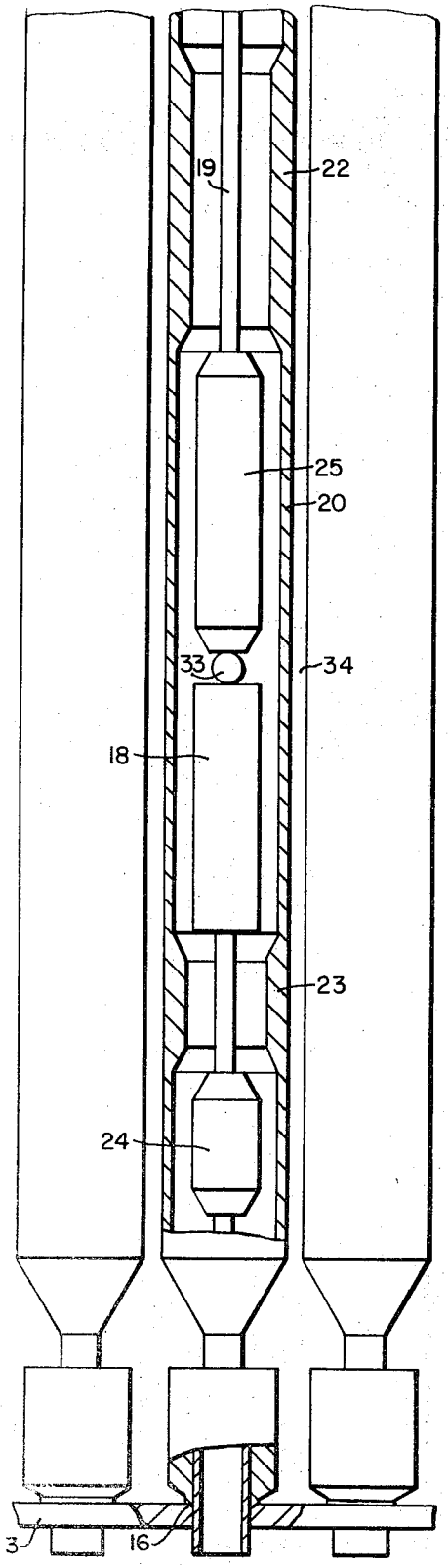
Figure 2B:
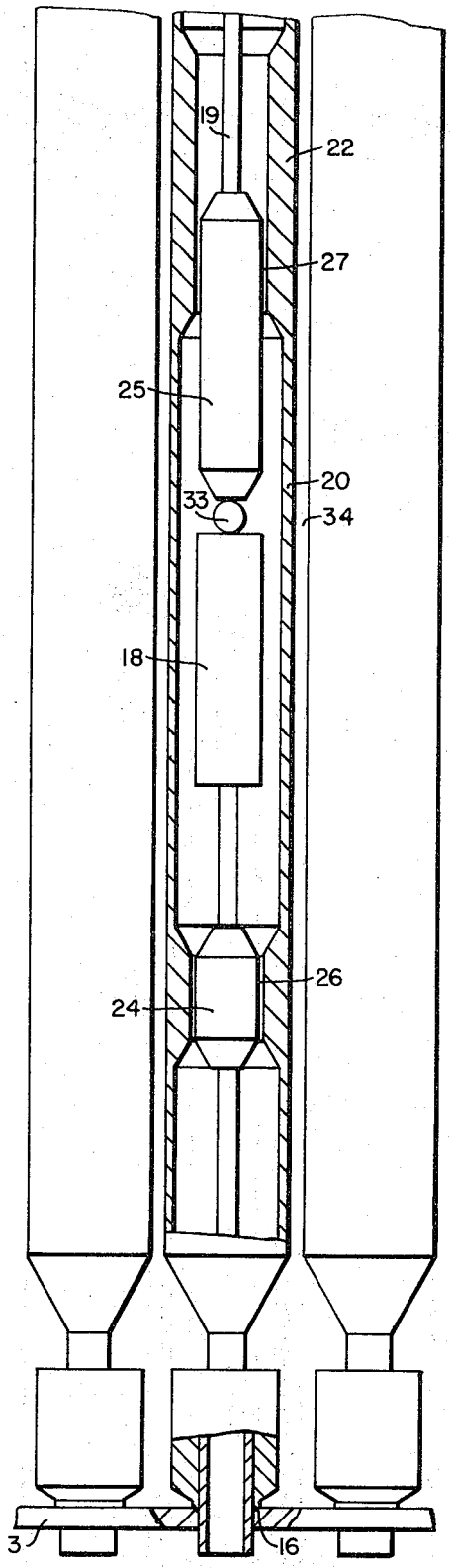
Figure 3A:
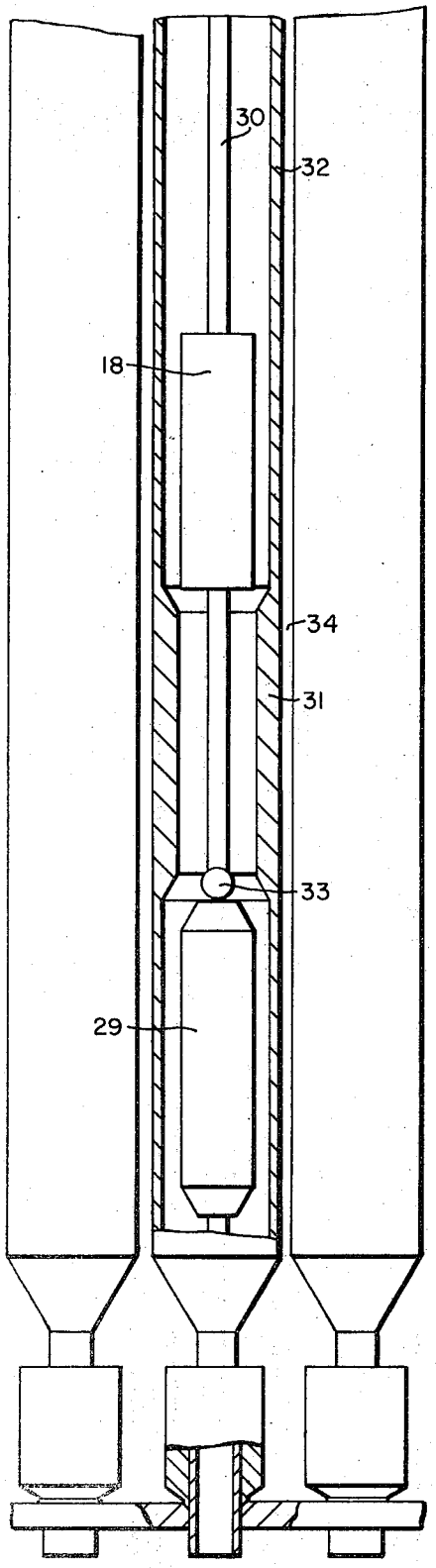
Figure 3B:
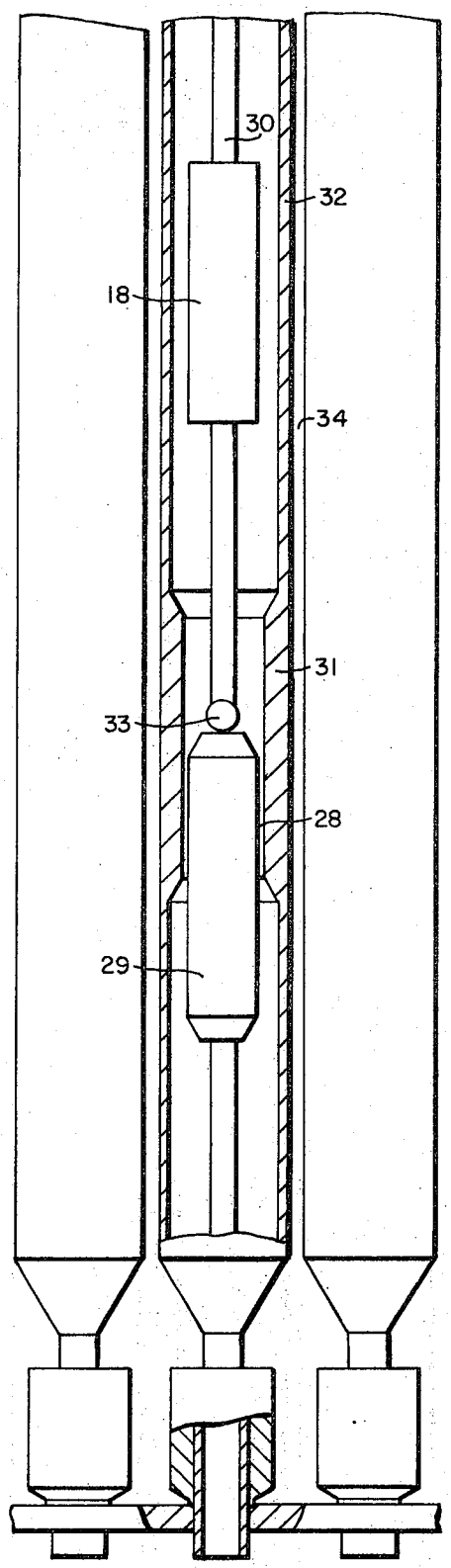

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 5, 1974

920 O.G. 6

T920,002
VARIABLE FLOW CONTROL FOR A NUCLEAR REACTOR CONTROL ROD

Richard D. Carleton, Pittsburgh, Pa., and Ajay Bhattacharyya, Vasteras, Sweden, assignors to Westinghouse Electric Corporation, Pittsburgh, Pa.

Filed Aug. 23, 1972, Ser. No. 283,260
**Int. Cl. G21c *7/08***
U.S. Cl. 176—36
3 Sheets Drawing. 12 Pages Specification

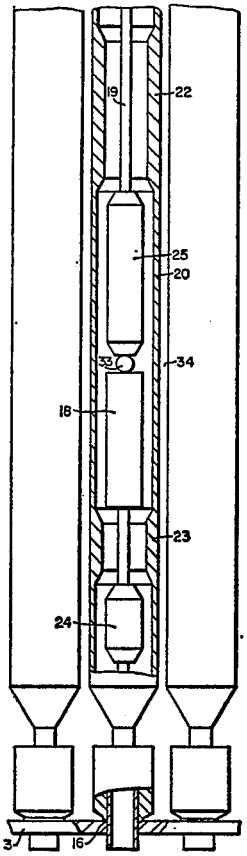

A variable flow control for a control rod assembly of a nuclear reactor that depends on turbulent friction through an annulus. The annulus is formed by a piston attached to the control rod drive shaft and a housing or sleeve fitted to the enclosure housing the control rod. As the nuclear fuel is burned up and the need exists for increased reactivity, the control rods are withdrawn, which

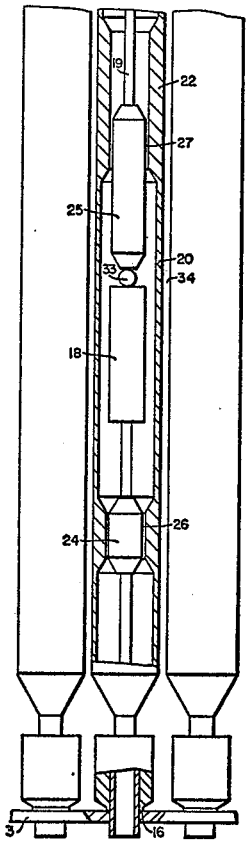

increases the length of the annulus and decreases the rate of coolant flow through the control rod assembly.

VARIABLE FLOW CONTROL FOR A NUCLEAR REACTOR CONTROL ROD

Filed Aug. 23, 1972 3 Sheets-Sheet 1

VARIABLE FLOW CONTROL FOR A NUCLEAR REACTOR CONTROL ROD

Filed Aug. 23, 1972 3 Sheets-Sheet 2

VARIABLE FLOW CONTROL FOR A NUCLEAR REACTOR CONTROL ROD

Filed Aug. 23, 1972 3 Sheets-Sheet 3